UNITED STATES PATENT OFFICE.

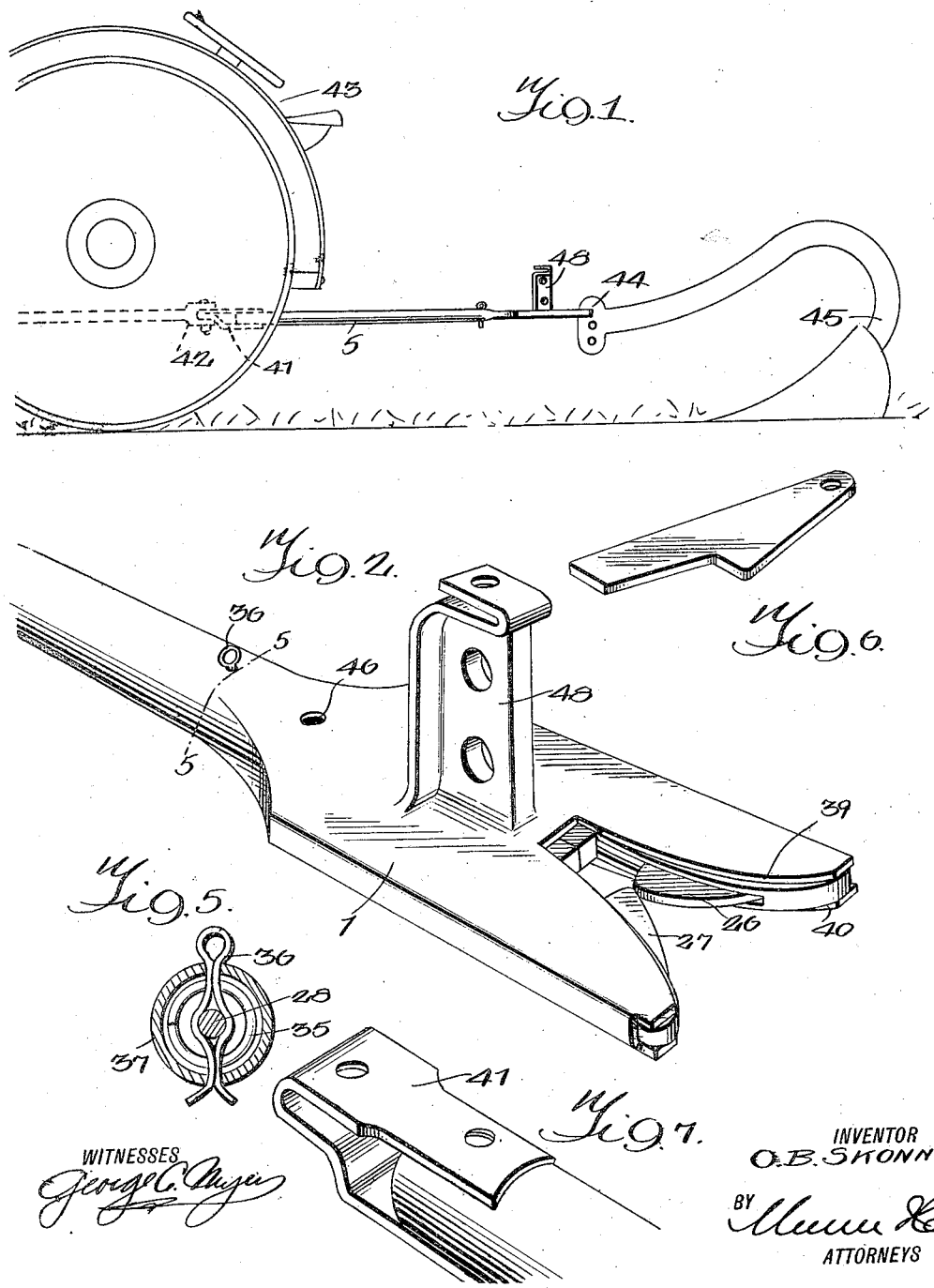

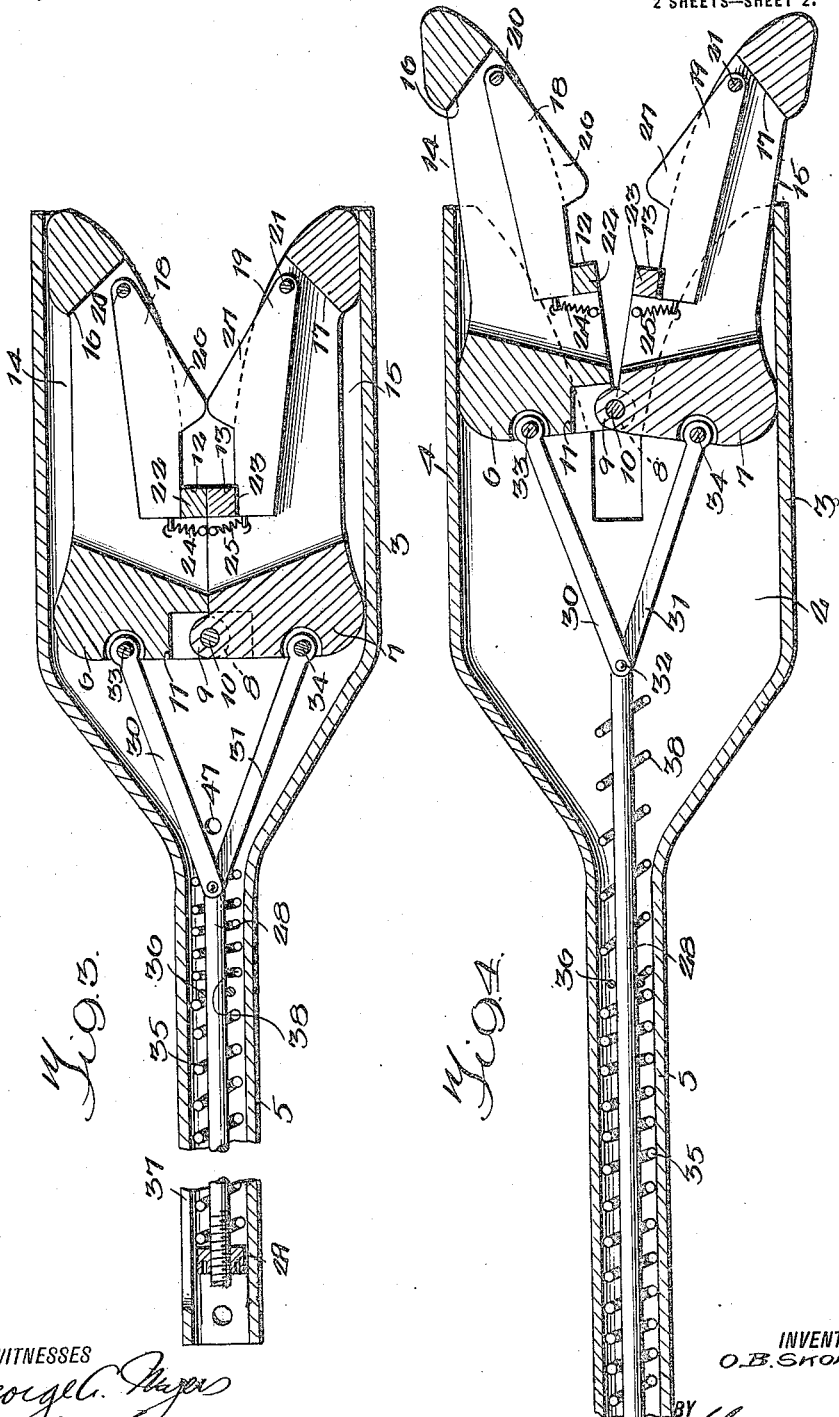

OLAF B. SKONNORD, OF VALLEY CITY, NORTH DAKOTA.

TRACTOR HITCH.

1,423,164.   Specification of Letters Patent.   Patented July 18, 1922.

Application filed December 2, 1921. Serial No. 519,467.

*To all whom it may concern:*

Be it known that I, OLAF B. SKONNORD, a citizen of the United States, and a resident of Valley City, in the county of Barnes and State of North Dakota, have invented certain new and useful Improvements in Tractor Hitches, of which the following is a specification.

My invention relates to tractor hitches of the type of construction in which a tractive force is imparted to an implement to be drawn through the medium of a spring member, and it consists in the combinations, constructions and arrangements herein described and claimed.

An object of my invention is to provide a tractor hitch which will be actuated automatically to release the load when an undue stress is placed upon the hitch and which moreover will be automatically set to again engage a load without any manual manipulation or adjustment of any of the parts thereof being required.

A further object of my invention is to provide a tractor hitch of the character described which is adapted for engagement with coupling connections of various ordinary types of construction and which therefore is adapted for use with various agricultural implements without any change in the construction of the latter being necessary.

A further object of my invention is to provide a tractor hitch of the character described which is adapted for use with tractors of various known types of construction.

A still further object of my invention is to provide a tractor hitch of the character described which can be readily converted from a flexible automatically releasing hitch into a non-flexible non-releasing hitch without in any way affecting the automatic coupling action of the device.

Other objects and advantages will appear in the following specification, and the novel features of the invention will be particularly outlined in the appended claims.

My invention is illustrated in the accompanying drawings, forming a part of this application, in which:—

Fig. 1 is a side elevation, showing my improved tractor hitch operatively applied, Fig. 2 is an enlarged perspective view of a fragmentary portion of the hitch, Fig. 3 is a longitudinal horizontal section through the hitch, showing movable parts thereof in one position, Fig. 4 is a view similar to Fig. 3, showing the movable parts in another position, Fig. 5 is a section along the line 5—5 of Fig. 2, Fig. 6 is a detail perspective of a latching plate embodied in the device, and Fig. 7 is a detail perspective of a fragmentary end portion of the hitch.

In carrying out my invention, I provide a casing having substantially parallel horizontally disposed upper and lower walls 1 and 2 respectively, such walls being connected along their side edges by side walls 3 and 4. The side walls 3 and 4 extend in parallelism from one end of the casing for part of their length and the side walls and the upper and lower walls converge at the other end of the casing and are merged into a tubular extension 5. The upper and lower walls and the side walls are made of metal and are preferably formed integrally with one another and with the tubular extension 5, into which these parts are merged.

Complementary carrying plates 6 and 7 are adapted to fit within the casing with the remote walls thereof in sliding contact with the inner faces of the side walls 3 and 4 and with the proximate walls of the carrying plates fashioned to abut one another along a straight line for part of the length of the plates. The plates 6 and 7 are formed with cooperating ears 8 and 9 respectively, extending laterally of the proximate sides thereof at the rear ends of the plates. A pin 10 is projected through these ears to hingedly connect the plates together. The plate 6 is provided with a recess 11 in its upper face in which the ear 9 of the plate 7 is partially received and in which the ear 9 may work when the plates 6 and 7 are swung apart at their forward ends about the axis of the pin 10, as illustrated in Fig. 4.

As illustrated to advantage in Figs. 3 and 4, the proximate walls of the plates 6 and 7 are cut away at 12 and 13 respectively intermediately of their length and are fashioned to diverge from the points at which cut away toward their forward ends, whereby a substantially V-shaped slot is defined by the forward portions of the carrying plates 6 and 7 when the plates are disposed within the casing, as illustrated in Fig. 3, and the proximate walls of the rear portions of the plates are fastened together. The plates 6 and 7 are fashioned with their remote walls cut away or curved inwardly between end portions thereof, as indicated at 14 and 15 respectively, whereby the forward portions of these plates may move apart from the position in which illustrated in Fig. 3 into the position in which illustrated in Fig. 4 when these plates are extended until the forward portions thereof protrude exteriorly of the casing. Horizontal pockets 16 and 17 respectively, are formed in the plates 6 and 7 and may extend from the proximate walls of these plates to the remote walls thereof intermediately of the length of the plates. Latching plates 18 and 19 respectively, are pivoted at their forward ends, as at 20 and 21 respectively, to work within the pockets 16 and 17. Stop lugs or web portions 22 and 23 respectively, extend between the upper and lower walls of the pockets or recesses 16 and 17 and are integral with such walls. The locking plates 18 and 19 are normally maintained with their proximate walls in contact with the stop members 22 and 23 respectively, through the agency of retractile springs 24 and 25 respectively. It will be observed that each of these springs has an end secured to the carrying plate on which disposed and that the other end thereof is attached to the latching plates, whereby the latching plates are yieldably maintained with integral laterally projecting portions thereof, indicated at 26 and 27, respectively, extending toward each other and beyond the adjacent portions of the proximate walls of the carrying plates 6 and 7. In other words, the projections 26 and 27 normally protrude within the substantially V-shaped slot defined by the diverging proximate walls of the carrying plates 6 and 7 at equal distances in advance of the points at which the proximate walls of the carrying plates are cut away. It is to be observed at this point that the projections 26 and 27 of the latching plates 18 and 19, are angular in longitudinal section and that the apices thereof are in contact with each other when the carrying plates 6 and 7 are entirely disposed within the casing, as illustrated in Fig. 3.

A rod 28 disposed within the tubular extension 5, is centered within the latter by a nut 29 which is screwed on the forward end of the rod and is slidably disposed within the tubular extension. A pair of diverging links 30, 31 are pivotally attached at 32 to the opposite end of the rod 28. The links 30 and 31 are pivotally attached at their forward ends to the plates 6 and 7, respectively, at the rear ends of the latter and intermediately of the proximate and remote walls thereof, as indicated at 33, 34 respectively. A spring 35 is coiled about the rod 28 and reacts at one end against a nut 29 and at its other end against a cotter pin 36 which is projected transversely through the tubular extension 5 adjacent to the juncture of the latter with the casing, with the arms of the cotter pin arranged to straddle the rod 28 so as to permit longitudinal movement of the latter. A slot 37 is provided in the tubular extension 5 through which a tool may be inserted to engage the nut 29, whereby the tension on the spring 35 may be varied at will. A second spring 38 is disposed on the rod 28 between the arms of the cotter pin 36 and the links 30 and 31, for a purpose which will be hereinafter set forth.

The upper and lower walls of the casing are cut away at the forward ends of the casing as indicated at 39 and 40, respectively, (see Fig. 2) to define a substantially V-shaped slot which is practically co-extensive with the slot defined by the diverging forward portions of the carrying plates 6 and 7 when the latter are entirely disposed within the casing.

From the foregoing description of the various parts of the device, the operation thereof will be readily understood. A clevis 41 is provided at the end of the tubular extension 5 for attaching the latter to a draw head 42 of a tractor of a well known type of construction, which tractor is denoted generally at 43 in the drawings. The tubular extension 5 and the casing will then extend rearwardly of the tractor and a coupling connection 44 of an implement, such as the plow indicated at 45, will be operatively connected with the tractor when the latter is backed, until the coupling connection 44, which may be a clevis, a ring, a coupling pin, or any coupling element such as is usually employed, is received within the V-shaped slot in the end of the casing. It will be manifest that the coupling connection 44 will contact the projections 26 and 27 of the latching plates 18 and 19 and will move these plates apart against the action of the springs 24 and 25, until the coupling connection is received in the space between the ends of the projections 26 and 27 and the adjacent portions of the contacting parts of the plates 6 and 7. The latching plates 18 and 19 will then be permitted to move together in response to the action of the springs 24 and 25 and the coupling connection 44 will be held against movement from the V-shaped slot. A further movement of the tractor will result in a tractive force being imparted through the spring 35, the rod 28, the links 30 and 31, the carrying plates 6 and 7, the latching plates 18 and 19, and the coupling connection 44 to the implement 45, whereby the latter will be drawn. When an excessive load is imposed on the spring 35 as when the implement 45 encounters an obstruction, the spring 35 will be compressed, thereby permitting the plates 6 and 7 to move from the position illustrated in Fig. 3 into the position in which illustrated in Fig. 4. Since the remote walls of the plates 6 and 7 are curved inwardly intermediately, these plates are permitted to move apart at their forward ends when extended beyond the casing and in consequence, the coupling connection 44 is released. As soon as the coupling connection is released, the plates 6 and 7 are returned to the position in which illustrated in Fig. 3 by the action of the spring 35 and will then be in position to again engage the coupling connection 44 or a like member, without any manual manipulation or adjustment of the parts of the device being required. The spring 38 receives the impact of the links 30 and 31 when the latter are moved into the position in which illustrated in Fig. 3 and any shocks or jars incident to the return of the plates 6 and 7 to retracted position, are thus dissipated. As pointed out in the foregoing, the nut 29 may be adjusted on the rod 28 to vary the tension on the spring 35 and to thereby afford a means for controlling to a certain extent, the movements of the plates 6 and 7 from retracted position to extended position.

If desired, a pin (not shown) may be projected through the registering openings 46 and 47 in the upper and lower walls of the casing to engage the links 30 and 31 at their juncture with the rod 28, and to thereby prevent such a movement of the plates 6 and 7 as will permit a releasing of a coupling connection held between such members by the latching plates 18 and 19. It is to be observed that the provision of the pin referred to will not in any way affect the operation of the spring controlled latching plates 18 and 19 and that the automatic coupling feature of the device still obtains.

In the event that it is desired to provide a rigid connection between the tractor 43 and the implement to be drawn, the latter may be attached to an upstanding projection 48 which is carried by the casing and is preferably integral therewith.

It will be obvious that an implement to be drawn may be closely connected with a tractor through the agency of my improved tractor hitch and that the connection will be sufficiently flexible and yielding to insure that the pull of the tractor will be communicated to the implement to be drawn in such a manner as to produce satisfactory results in the service for which intended.

The upstanding projection 48 provides a means which may be connected with the tractor in such a manner as to support the hitch at its outer end.

It will of course be understood that the clevis 41 and the projection 48 may be varied considerably in order to connect with tractors of different known types of construction, without departing from the spirit of the invention.

I claim:—

1. A device of the character described comprising a casing adapted at one end for connection with the draw head of a tractor and having a slot in its other end, hingedly connected complementary carrying plates slidably disposed in said casing, spring controlled latching plates carried by said carrying plates and arranged with portions thereof projecting into said slot in the casing when the carrying plates are in retracted position in the casing, said latching plates being adapted to coact and to cooperate with said carrying plates to hold a coupling connection received in the slot when the carrying plates are in retracted position and to release the coupling connection when the carrying plates are in partially protracted position, and means arranged between said carrying plates and the casing for resisting a force tending to move said carrying plates from retracted position, said last named means being arranged to yield when subjected to an excessive load.

2. A device of the character described comprising a casing having a tubular prolongation at one end and having a substantially V-shaped slot extending longitudinally thereof from its other end, said prolongation being adapted for connection with the draw head of a tractor, hingedly connected carrying plates slidably disposed within said casing, the forward portion of the proximate walls of said carrying plates diverging in substantial conformity to the divergence of the walls of said slot and the remaining portion of the proximate walls of said carrying plates abutting each other when the carrying plates are in retracted position in the casing and being movable apart when the carrying plates are in partially extended position, latching plates pivotally attached to said carrying plates, said latching plates being formed with laterally projecting portions arranged to confront each other, spring means associated with said latching plates for yieldingly maintaining said latching plates in position to cause the laterally extending portions to contact each other and to provide an obstruction across the slot of said casing when the carrying plates are in retracted position, a rod slidably disposed in the tubular prolongation of the casing, links connecting the rod and the carrying plates, a coiled expansion spring disposed on said rod, means carried by the tubular prolongation for engaging the spring at its inner end, and a nut threadedly engaging the rod at its outer end and engaging the spring to maintain the latter under tension, whereby the carrying plates are yieldingly maintained in retracted position in the casing.

3. A device of the character described comprising a casing having a tubular prolongation at one end and having a substantially V-shaped slot extending longitudinally thereof from its other end, said prolongation being adapted for connection with the draw head of a tractor, hingedly connected carrying plates slidably disposed within said casing, the forward portion of the proximate walls of said carrying plates diverging in substantial conformity to the divergence of the walls of said slot and the remaining portion of the proximate walls of said carrying plates abutting each other when the carrying plates are in retracted position in the casing and being movable apart when the carrying plates are in partially extended position, latching plates pivotally attached to said carrying plates, said latching plates being formed with laterally projecting portions arranged to confront each other, spring means associated with said latching plates for yieldingly maintaining said latching plates in position to cause the laterally extending portions to contact each other and to provide an obstruction across the slot of said casing when the carrying plates are in retracted position, a rod slidably disposed in the tubular prolongation of the casing, links connecting the rod and the carrying plates, a coiled expansion spring disposed on said rod, means carried by the tubular prolongation for engaging the spring at its inner end, a nut threadedly engaging the rod at its outer end and engaging the spring to maintain the latter under tension, whereby the carrying plates are yieldingly maintained in retracted position in the casing, and a shock-absorbing member associated with said rod at the juncture of the latter with said links.

4. A device of the character described, comprising a casing adapted at one end for connection with a traction device and having a slot in its other end adapted to receive a coupling element, hingedly connected complementary carrying plates slidably disposed in said casing, spring controlled latching plates carried by said carrying plates for closing the slot when said carrying plates are in retracted positions in the casing, and means arranged between said carrying plates and the casing for resisting a force tending to move said carrying plates from retracted positions, said last named means being arranged to yield when subjected to an excessive load.

5. A device of the character described comprising a casing adapted at one end for connection with a traction device and having a substantially V-shaped slot in its other end, complementary carrying plates disposed in a said casing and being provided with stops adjacent to their proximate edges, latching plates pivotally attached to said carrying plates and having portions extending from their proximate sides toward each other, and spring means tending to maintain said latching plates against said stops, whereby the extensions to said latching plates project into and close said slot when the carrying plates are in retracted position.

6. A device of the character described comprising a casing adapted at one end for connection with a traction device and having a substantially V-shaped slot in its other end, hingedly connected carrying plates slidably disposed within said casing and having portions of their proximate walls cut away at the ends nearest to the slotted end of the casing to diverge in substantial conformity to the divergence of the walls of said slot, spring controlled means movably supported upon said carrying plates for closing said slot when the carrying plates are in retracted position in the casing, and means arranged between said carrying plates and the casing for resisting a force tending to move said carrying plates from retracted position, said last named means being arranged to yield when subjected to an excessive load.

OLAF B. SKONNORD.